Patented Mar. 22, 1949

2,464,925

UNITED STATES PATENT OFFICE 2,464,925

WELDING FLUX

Francis Arthur Fox, Swinton, and Edward Frederick Emley, Salford, Manchester, England, assignors to Magnesium Elektron Limited, London, England, a British company No Drawing. Application June 2, 1945, Serial No. 597,386. In Great Britain June 14, 1944

2 Claims. (Cl. 148—26)

This invention relates to welding.

In the welding of magnesium base alloys a difficulty has heretofore been experienced in the corrosion arising from the trace of flux remaining in the weld or weld metal. These fluxes generally contain chlorides such as lithium, sodium, potassium, calcium, barium, and magnesium chlorides. The present invention aims at obviating this difficulty by the provision of a flux free from such corrosion producing chlorides and whilst the flux is chiefly intended for use in welding magnesium and magnesium base alloys, fluxes according to the present invention can also be used for welding aluminium and aluminium base alloys.

With this object in view, we have made experiments with a view to producing fluxes consisting solely of mixtures of fluorides. We first aimed at producing binary eutectics but it was found that the melting points of these eutectics were too high. In addition to binary eutectics the melting points of which were already published the following were tried: lithium/potassium, lithium/sodium, lithium/barium, potassium/barium.

Further experimental work was undertaken with a view to producing mixtures having lower melting points and in the course of these experiments a good deal of burning of the magnesium occurred which we at first thought possibly due to moisture absorbed in the hygroscopic salt, potassium fluoride. However, when the salts were thoroughly dried and even when the potassium fluoride was prepared by heating $KHF_2$ the flux still caused burning of the metal. Thermodynamic calculation indicated that both sodium fluoride and potassium fluoride would be decomposed by magnesium to some extent during welding, thereby liberating free alkali metal which causes burning of magnesium, and we have since confirmed this in various ways. It is therefore necessary wholly or mainly to exclude these fluorides from the flux.

Various mixtures however did not produce satisfactory characteristics.

We have however now ascertained that fluxes having suitable characteristics can be produced by mixing the fluorides of lithium, magnesium, calcium, and barium in certain proportions. Other fluorides which can be used in the flux are the fluorides of strontium, cerium, zinc, aluminium, manganese, ammonium bifluoride, and certain complex fluorides, e. g. $Li_2TiF_6$. Salts of cerium, zinc, and aluminium should only be used in small proportions and only when the alloying of these metals with the work is unobjectionable.

According to the present invention the flux consists substantially wholly of fluorides and at least eighty-five percent of the flux consists of the following fluorides in the percentages stated:

| | Per cent |
|---|---|
| Lithium fluoride | 16 to 24 |
| Magnesium fluoride | 23 to 33 |
| Calcium fluoride | 14 to 20 |
| Barium fluoride | 29 to 41 | in the absence of more than three percent of sodium fluoride and potassium fluoride together, and is substantially fluid at 610° C.

With a view to lowering the sodium fluoride and potassium fluoride contents of the finished fluxes to the smallest possible amounts we have adopted the following procedures:

(i) Extraction of the finished flux with water.

(ii) Separate extractions of the lithium fluoride and of the remaining constituents with water subsequently mixing the extracted products.

As the fluorides of potassium and sodium are water-soluble in contrast to the others, they may be very simply washed out or eliminated in such manner.

(iii) Treatment of the molten flux with metallic magnesium, if desired in an inert atmosphere, the magnesium containing sodium being subsequently poured off.

We have also melted together the constituents of the fluxes instead of merely mixing them and have subsequently crushed and milled the fused product.

At least ninety-five percent or even the whole of the flux may consist of the fluorides of lithium, magnesium, calcium and barium. The following suitable composition is cited by way of example:

| | Per cent |
|---|---|
| Lithium fluoride | 20 |
| Magnesium fluoride | 28 |
| Calcium fluoride | 17 |
| Barium fluoride | 35 |

We claim:

1. A welding flux consisting substantially wholly of fluorides and at least eighty-five percent of which consists of the following fluorides in the percentages stated:

| | Per cent |
|---|---|
| Lithium fluoride | 16 to 24 |
| Magnesium fluoride | 23 to 33 |
| Calcium fluoride | 14 to 20 |
| Barium fluoride | 29 to 41 | in the absence of more than three percent of the fluorides of potassium and sodium and being substantially fluid at 610° C.

2. A welding flux consisting substantially of fluorides, of which lithium fluoride is about 20%, magnesium fluoride about 28%, calcium fluoride about 17%, and barium fluoride about 35%.

FRANCIS ARTHUR FOX.
EDWARD FREDERICK EMLEY.

REFERENCES CITED

The following references are of record in the file of this patent:

UNITED STATES PATENTS

| Number | Name | Date |
|---|---|---|
| 2,283,884 | Nelson | May 19, 1942 |
| 2,396,604 | Reimers | Mar. 12, 1946 |

FOREIGN PATENTS

| Number | Country | Date |
|---|---|---|
| 540,075 | Great Britain | Oct. 3, 1941 |
| 849,311 | France | Aug. 11, 1939 |